United States Patent Office — 3,067,226 — Patented Dec. 4, 1962

3,067,226
PREPARATION OF ORGANOTIN COMPOUNDS
Hugh E. Ramsden, Scotch Plains, N.J., assignor to Esso Research and Engineering Company, a corporation of Delaware
No Drawing. Filed Apr. 20, 1960, Ser. No. 23,368
7 Claims. (Cl. 260—429.7)

The present invention relates to an improved process for preparing alkyl and cycloalkyl tin compounds via a Grignard-type reaction. Specifically, it concerns the synthesis of saturated organotin compounds that are useful gasoline and oil additives, by reacting an organo halogen compound with a tin halide, including hydrocarbon tin halides, in the presence of a suitable metal and an oxide catalyst.

Heretofore in the preparation of organic tin compounds it was necessary to use ethers, especially diethyl ether, in order to sufficiently activate the magnesium and the Grignard reagent which is formed in situ during the synthesis. While diethyl ether is an excellent catalyst for Grignard reactions, it is hazardous to work with on a commercial scale. Moreover, it is usually necessary to employ large quantities of diethyl ether in a Grignard synthesis and this makes most processes costly, since it is necessary to employ expensive recovery techniques in order to avoid substantial loss of the catalyst. All of the foregoing difficulties can be avoided or substantially eliminated by the use of metal organo oxide catalysts which are not hazardous and which can be used in relatively small amounts. For example, there are no separation and recovery problems similar to those encountered in processes in which diethyl ether is employed. Moreover, these organo oxide catalysts are unique in that they have an activity that is substantially equivalent to that of diethyl ether in the process to be described hereinafter. Many other catalysts have been studied in this process but none has been as effective as diethyl ether.

It is an object of the present invention to provide an improved method of producing high yields of alkyl and cycloalkyl tin compounds through a Grignard synthesis without the use of diethyl ether.

In accordance with the present invention, organotin compounds are prepared by reacting an alkyl or cycloalkyl halide with a tin halide in the presence of magnesium and a small amount of a metal organo oxide catalyst. The reaction, which is carried out under anhydrous conditions, is conveniently effected at temperatures ranging from approximately room temperature to about 150° C. The reflux temperature of the solvent, which may be any inert hydrocarbon liquid, is highly suitable for establishing the temperature at which the reactions of the present invention are carried out, provided the aforesaid reflux temperature does not substantially exceed 150° C. Once the reaction has commenced, the reaction will usually be complete within a few minutes to 10 or even 15 hours.

The alkyl or cycloalkyl halide reactant "RX" may be any suitable chloride, bromide or iodide compound having 1 to 8 carbon atoms. Among the iso- and n-alkyl halides which are useful in the practice of the process are butyl chloride, methyl chloride, ethyl chloride, butyl bromide, isobutyl chloride and hexyl chloride. Suitable cycloalkyl halides include compounds, such as cyclohexyl chloride and cyclopentyl bromide. Of the foregoing compounds butyl bromide and especially butyl chloride are the preferred reactants because of the high reactivity of these halogen compounds and the large number of uses for butyl tin compounds.

While the magnesium used in the synthesis of the organotin compounds may be in any useful form, e.g. turnings, chips, foil or coarse powder, magnesium turnings are preferred because they are relatively inexpensive and may be utilized without difficulty. This is a surprising feature of the invention particularly in view of the fact that magnesium turnings have not been successfully used to make Grignard reagents with metal organo oxide catalysts described herein. In order to prepare Grignard reagents with the aforementioned catalysts, it has been necessary to employ finely divided magnesium particles, e.g. 200 mesh or finer. On the other hand, magnesium turnings have been found to be highly useful in the present process for making organotin compounds.

It is advisable, and generally necessary, to activate the magnesium turnings with a small amount of an alkyl halide compound, such as ethyl or butyl bromide. It is also sometimes useful to add a crystal or two of iodine to the reaction medium to assist in the initiation of the reaction. These and other well known methods for initiating Grignard reactions may be employed where necessary.

The stannic halide reagent should, of course, be anhydrous and essentially free of any interfering impurities that may reduce the reaction rate or decrease the yield. For most purposes it will be found that stannic halides having a purity of at least 90% will be entirely satisfactory. While the most common and useful reagent is stannic chloride, any inorganic or organic tin halide compound, in which the tin has a valence of 4, may be employed.

Substantially any aliphatic or aromatic hydrocarbon solvent may be employed. However, the preferred inert solvents for the present process are liquid hydrocarbons having 5 to 8 or 10 carbon atoms, such as benzene, toluene, heptane, octane, pentane and isoheptane.

The metal organo oxide catalyst comprises the reaction product of a groups I to III metal (Periodic Chart of Elements in Lange's Handbook of Chemistry, 8th edition, pages 56–57), such as magnesium, aluminum, zinc or sodium, and a primary, secondary or tertiary aliphatic or cyclic alcohol, such as isopropyl alcohol, propanol, ethanol, n-lauryl alcohol, benzyl alcohol, tertiary butyl alcohol and phenol. In general, the organic portion of the catalyst contains 1 to 15 carbon atoms and may have one or more other functional groups, such as a carbonyl group. The preferred catalysts are $C_1$ to $C_6$ group III metal oxides, especially aluminum isopropoxide.

It will be found that stoichiometric amounts of the reagents will produce satisfactory results. However, the quantity of each reactant may be varied according to the yield, rate of reaction and product desired. Broadly speaking, using 1 mole of magnesium turnings as a reference point, about 1 mole of hydrocarbon halide reactant (RX) and 0.25 mole of stannic chloride are admixed with about 0.005 to 0.5 mole of the metal organo oxide catalyst and about 100 to 1000 ml. of inert solvent. It may be desirable in some cases to use a slight excess of the organo halide component.

Hydrocarbon tin halides, such as alkyl or aryl tin trihalide, dialkyl or diaryl tin dihalide and trialkyl or triaryl tin monohalide, may be substituted for the stannic chloride reagent. If a hydrocarbon trihalide tin compound is employed, the ratio of the organo halide to the tin compound should be approximately 1:0.3; if a dihydrocarbon dichloride tin derivative is employed, the ratio should be about 1:0.5; and if a trihydrocarbon monochloride tin compound is used the ratio should be substantially 1:1. Thus, the ratio of the hydrocarbon halide compound to the tin halide reactant may vary from 1:0.1 to 1:1.5. Likewise, when aluminum isopropoxide is utilized, the preferred ratio of magnesium turnings to catalyst is 1:0.01 to 1:0.1.

The following equation shows one embodiment of the present invention:

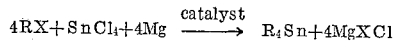
$$4RX + SnCl_4 + 4Mg \xrightarrow{catalyst} R_4Sn + 4MgXCl$$

in which R is an alkyl or cycloalkyl group and X is chlorine or bromine. It is of course understood that various reactions take place during the reaction period so that in many instances the product comprises a mixture of tin compounds. For example, it is likely that a mixture of tetrabutyl tin and tributyl tin chloride will be obtained when butyl chloride is substituted for "RX" in the above equation. Small amounts of dibutyl tin dichloride may also be produced. If desired, additional Grignard reagent may be added to the reaction product to convert substantially all of the tin compounds to tetraalkyl products since these compounds are quite useful as anti-knock agents, catalysts and intermediates in the preparation of various fungicides, slimicides and preservatives.

The following example shows how the process of the present invention may be carried out. It should not, however, be considered to limit the invention which has been broadly described above.

*Example*

Magnesium turnings (24.3 g. or 1 gram atom) were placed in a three-neck one liter flask equipped with a dropping funnel, a stirrer, reflux condenser and a thermometer. To the magnesium in the flask was added 8.8 g. of aluminum isopropoxide (0.05 mole) and 80 ml. of dry heptane and the flask was swept with dry nitrogen prior to refluxing the mixture. As soon as the mixture begin refluxing, 3 ml. of butyl bromide and an iodine crystal were added to the mixture followed by a premix consisting of 92.5 g. (1 mole) of butyl chloride, 65 g. (0.25 mole) of stannic chloride and 200 ml. of dry heptane. The premix was added dropwise over a period of 400 minutes. After all of the premix had been added to the reaction mixture, the mixture was stirred for an additional 15 minutes and then allowed to cool overnight. The mixture was again refluxed with stirring until the temperature reached 99° C. whereupon it was allowed to cool and 50 ml. of water and dilute hydrochloric acid (50 ml. of concentrated acid in 200 ml. of water) were then added to the mixture with stirring. The reaction mixture was then transferred to a separatory funnel and the water layer was drawn off. The water layer was washed with 100 ml. of heptane and this was added to the organic layer which was stripped free of heptane by distillation. The residual crude product was thereafter subjected to vacuum (5 mm. of mercury) fractionation. The temperature of the vapor in the distillation zone was between 126 and 130° C. The butyl tin products weighed 68.5 g. and contained a total of 7.63% chlorine. This corresponds to 69.5% tributyl tin chloride and 30.5% tetrabutyl tin. No dibutyl tin dichloride was found in the tin product. The over-all yield of tin was 82.8% and the total butyl yield was 68.1%.

It is not intended to restrict the present invention to the foregoing embodiment, but rather it should only be limited by the appended claims in which it is intended to claim all the novelty inherent in the invention.

What is claimed is:

1. A method for producing polyalkyl and polycycloalkyl tin compounds which consists essentially of reacting a compound selected from the group consisting of alkyl halides and cycloalkyl halides containing up to eight carbon atoms per molecule with an anhydrous, tetravalent tin halide and magnesium metal in the presence of an inert hydrocarbon solvent and a small, catalytic amount of a metal organo oxide catalyst selected from the group consisting of a reaction product of magnesium, aluminum, zinc and sodium with primary, secondary, tertiary and cyclic alcohols of from one to six carbon atoms per molecule.

2. A method for producing polyalkyl tin compounds which consists essentially of reacting a $C_1$ to $C_8$ alkyl halide with anhydrous tin tetrachloride and magnesium metal in the presence of an inert hydrocarbon solvent and a small, catalytic amount of a metal organo oxide catalyst selected from the group consisting of the reaction products of magnesium, aluminum, zinc and sodium with primary, secondary, tertiary and cyclic alcohols of from one to six carbon atoms per molecule.

3. A method for producing polyalkyl tin compounds which consists essentially of reacting a $C_1$ to $C_8$ alkyl halide with anhydrous tin tetrachloride and magnesium turnings in stoichiometric amounts, in the presence of an inert hydrocarbon solvent and about 0.005 to 0.05 moles of an aluminum alkoxide catalyst containing from one to six carbon atoms per molecule per mole of magnesium turnings at temperatures between room temperature and 150° C.

4. The method according to claim 3 in which the aluminum alkoxide catalyst is aluminum isopropoxide.

5. A method for producing polybutyl tin compounds which consists essentially of reacting butyl chloride with anhydrous tin tetrachloride and magnesium turnings in stoichiometric amounts in the presence of an inert hydrocarbon solvent and a small, catalytic amount of a metal organo oxide catalyst selected from the group consisting of the reaction products of magnesium, aluminum, zinc and sodium with primary, secondary, tertiary and cyclic alcohols of from one to six carbon atoms per molecule at temperatures between room temperature and 150° C.

6. The method according to claim 5 in which the metal organic oxide catalyst is an aluminum alkoxide containing from one to six carbon atoms per molecule.

7. The method according to claim 5 in which the catalyst is aluminum isopropoxide and is used in amounts of about 0.005 to 0.5 mole per mole of magnesium turnings.

References Cited in the file of this patent

UNITED STATES PATENTS

| 2,675,399 | Ramsden et al. | Apr. 13, 1954 |
| 2,977,379 | Dorfelt et al. | Mar. 28, 1961 |

FOREIGN PATENTS

| 692,556 | Great Britain | June 10, 1953 |

OTHER REFERENCES

Kharasch et al.: "Grignard Reactions of Nonmetallic Substances," Prentice-Hall, Inc., 1954, pages 53–56.